Dec. 9, 1947.  E. B. ENITI ET AL  2,432,232
ATTACHMENT FOR TIRE CHAINS
Filed Nov. 9, 1946

Inventor
Ernest B. Eniti
Leo A. Nichols

By *Clarence A. O'Brien and Harvey B. Jacobson*
Attorneys

Patented Dec. 9, 1947

2,432,232

UNITED STATES PATENT OFFICE 2,432,232

ATTACHMENT FOR TIRE CHAINS

Ernest B. Eniti and Leo A. Nichols, Plainfield, Vt.

Application November 9, 1946, Serial No. 708,900

2 Claims. (Cl. 152—223)

This invention relates to new and useful improvements and structural refinements in tire chains and more specifically, in tire chain attachments, and the principal object of the invention is to provide a device of the character herein described which may be conveniently and effectively employed to prevent lateral skids.

A further object of the invention is to provide a tire chain attachment which is simple in construction and which will readily lend itself to economical manufacture.

Another object of the invention is to provide an attachment which may be quickly and easily applied to or removed from various types of conventional tire chains and which will not interfere with the normal function and operation of such chains.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
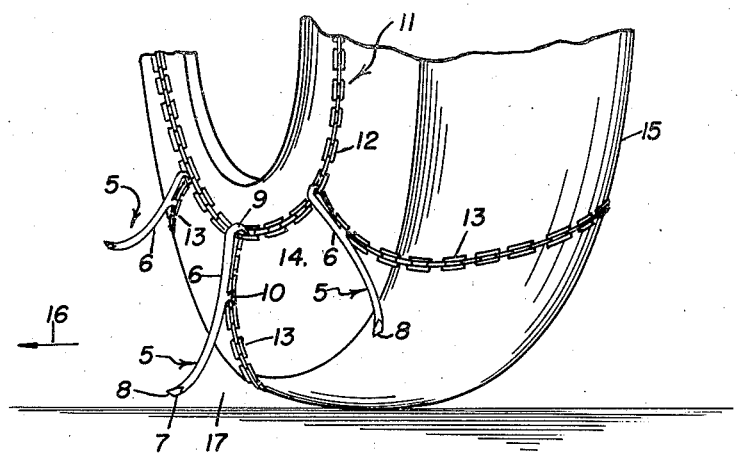
Figure 1 is a perspective view of the invention, showing the same in situ on a tire chain.

Referring now to the accompanying drawings in detail, the invention consists of a tire chain attachment designated generally by the reference character 5, the same embodying in its construction a rod-like arm 6 provided at one end thereof with a flattened, arcuated portion 7 which terminates in a sharp edge 8.

Figure 2:
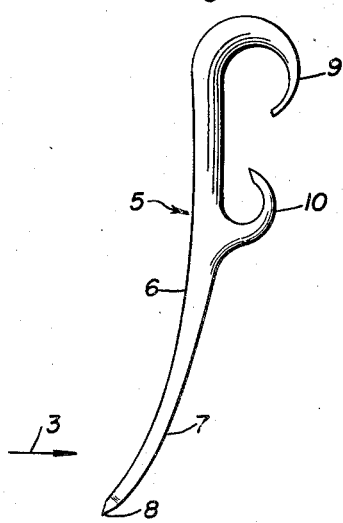
Figure 2 is an elevational view of the invention per se.
Figure 3:
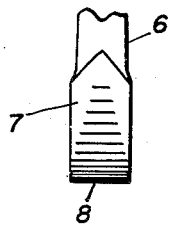
Figure 3 is a fragmentary elevational view, taken in the direction of the arrow 3 in Figure 2.

The remaining end portion of the arm 6 is arcuated to form a hook 9 and a further hook 10 is provided medially the length of the arm, as is best shown in Figure 2.

It will be noted that the hooks 9 and 10 are relatively opposed and that they are disposed at the opposite side of the arm with respect to the direction of the arcuate portion 7.

The invention is primarily intended for use in association with a conventional tire chain designated generally by the reference character 11, the same including in its construction, a pair of spaced rings one of which is shown at 12 and a plurality of transversely extending ties 13.

The invention is attached to the tire chain by engaging the hook 9 with the ring 12 and similarly engaging the hook 10 with one of the ties 13, as will be clearly apparent from Figure 1. A plurality of attachments may, of course, be employed on each wheel and it will be noted that the attachments are so disposed that the hook carrying portions of the arms 6 are positioned adjacent the side wall 14 of the tire 15.

When so attached, the arcuate extremities 7 of the attachments will project laterally or outwardly from the tire chain and the length of the arm is such that the extremities 8 do not contact the ground when the vehicle is traveling under normal conditions.

However, if the vehicle should skid laterally as indicated by the arrow 16, the ties 13 at the bottom of the wheel will be urged in the direction of the arrow 17, and as a result, the extremities 8 of the arm 6 will effectively embed themselves in the ice covered ground and lateral skidding will thus be prevented.

It will be also observed that the configuration and relative positioning of the hooks 9 and 10 is such as to securely yet removably retain the attachments on the tire chains and it should, of course, be understood that the attachments are provided only at the outside of the wheels.

It is believed that the advantages and use of the invention will be clearly apparent from the foregoing disclosure, and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

1. An attachment for tire chains comprising an arm provided with an arcuate end portion, said arcuate portion forming a prong and terminating in a sharp extremity, a hook provided at the remaining end and a further hook formed medially the length of said arm, said hooks being relatively opposed and adapted to engage the tire chain, said prong being engageable with the ground.

2. In association with a tire chain including a ring disposed adjacent the tire wall and a plurality of transversely extending ties, an attachment comprising a rod-like arm provided with a flattened, arcuated end portion, said end portion constituting a prong and terminating in a sharp edge, a hook provided at the remaining end and a further hook formed medially the length of said arm, said hooks being relatively opposed and adapted to engage said ring and one of said ties respectively, the hook equipped portion of said arm being disposed adjacent the tire wall and said prong extending laterally and being engageable with the ground.

ERNEST B. ENITI.
LEO A. NICHOLS.

REFERENCES CITED

The following references are of record in the file of this patent:

UNITED STATES PATENTS

| Number | Name | Date |
|--------|------|------|
| 304,320 | Hibberd et al. | Sept. 2, 1884 |
| 1,453,956 | Smith | May 1, 1923 |